C. E. OELMAN.
MACHINE FOR MIXING DOUGH.
APPLICATION FILED JUNE 5, 1911.

1,019,076.

Patented Mar. 5, 1912.

2 SHEETS—SHEET 1.

Witnesses
Anna C. Rauler
Chas. W. Stauffiger

Inventor
Curt E. Oelman

By
Attorneys

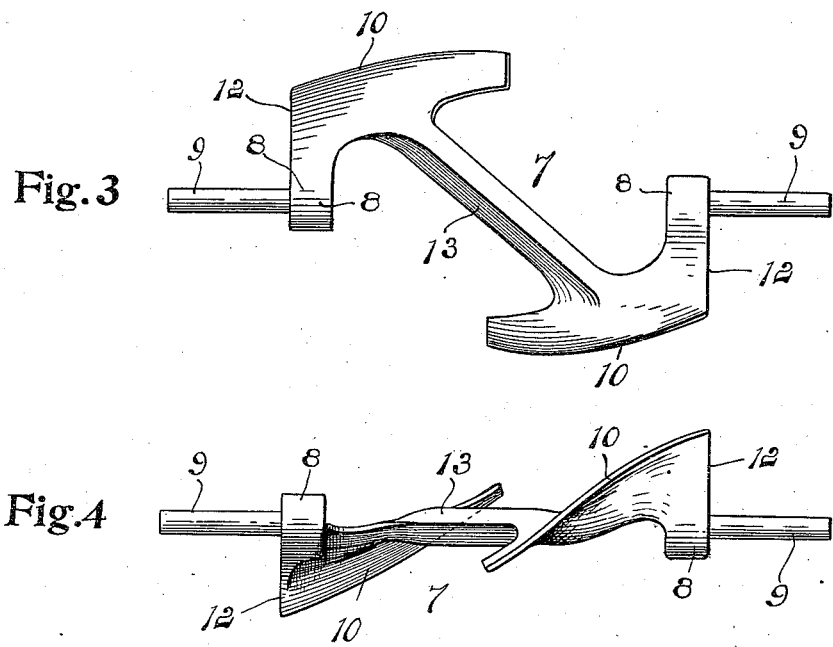
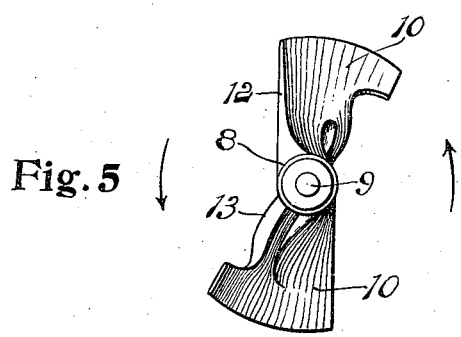

UNITED STATES PATENT OFFICE.

CURT E. OELMAN, OF DETROIT, MICHIGAN.

MACHINE FOR MIXING DOUGH.

1,019,076.  Specification of Letters Patent.  Patented Mar. 5, 1912.

Application filed June 5, 1911. Serial No. 631,351.

*To all whom it may concern:*

Be it known that I, CURT E. OELMAN, a citizen of the United States of America, residing at Detroit, in the county of Wayne and State of Michigan, have invented certain new and useful Improvements in Machines for Mixing Dough, of which the following is a specification, reference being had therein to the accompanying drawings.

This invention relates to improvements in machines for mixing dough and its object is to provide a machine having a rotary agitator or mixer so constructed that the dough is thoroughly divided and mixed thereby in a manner approximating hand kneading, and to provide certain other new and useful features in the construction and arrangement of parts all as hereinafter more fully described reference being had to the accompanying drawings, in which—

Figure 1:
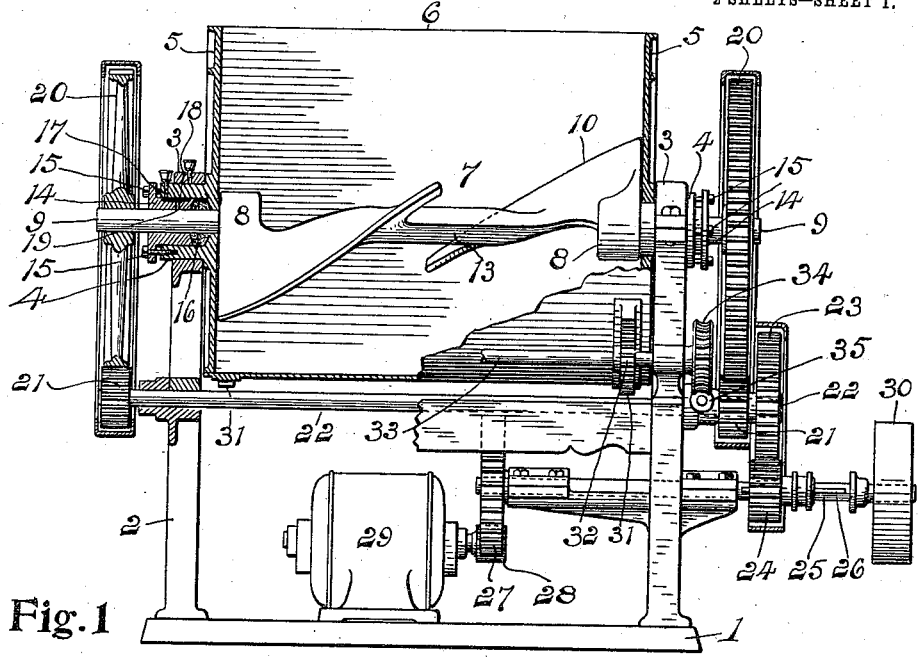
Figure 2:
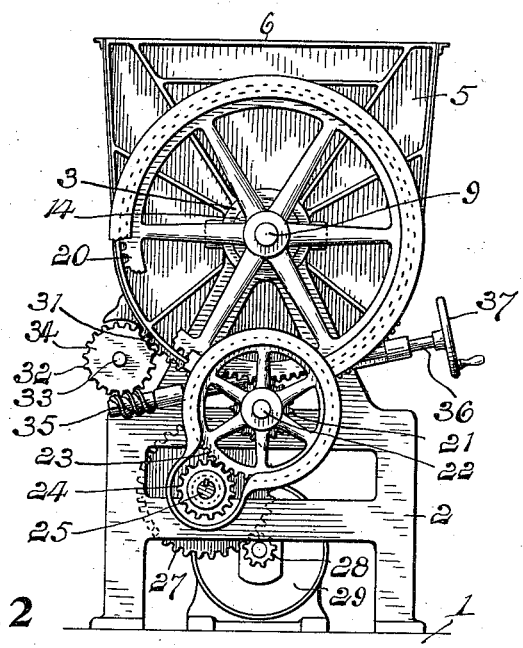

Figure 1 is a side elevation of a machine embodying the invention with portions broken away to show the construction; Fig. 2 is an end elevation of the same; Fig. 3 is a plan view of the rotary agitator or mixer detached; Fig. 4 is an edge view of the same; and Fig. 5 an end elevation.

As shown in the drawings 1 is a suitable base upon which is erected end supporting frames 2 each provided with a bearing 3 at its upper end to receive an outwardly extending hollow hub 4 formed integral with the end walls 5 of a trough or receptacle 6 for the dough. This trough is preferably formed with a round bottom which is concentric with the axes of the hubs 4.

Within the trough or receptacle is a rotatable agitator or mixer 7 formed with hub portions 8 at each end and with outwardly extending stub shafts 9. The mixer is provided with a spirally shaped and inclined blade 10 adjacent to each end of the trough and at opposite sides of the axis of rotation of the mixer. The blades are formed integral with the hub portions 8 each having straight outer ends 12 to sweep the inner face of the end walls of the trough. The blades are preferably of such a length that the inner end of each overlaps the path of travel of the inner end of the other blade. A straight member or bar 13 which is preferably rectangular in cross section connects the blades and is formed integral therewith intermediate the ends of each blade, said bar extending diagonally across the axis of rotation of the mixer.

The stub shafts 9 of the mixer extend outward through bearings therefor in followers 14 which fit within the hollow hubs 4 and are forced into the hubs and held in place by means of bolts 15 passing through a flange on the follower and engaging screw-threaded openings in the outer ends of the tubular hubs 4. Packing 16 is placed within each hub 4 between the inner end of the follower and the end of the bore of the tubular hub to form a tight joint and prevent oil from working into the trough around the shafts. An oil hole 17 is provided in the outer end of each hub 4 to receive an oil cup, the inner end of which hole registers with a longitudinal oil duct or groove 18 in the face of the follower 14 and leading from this groove is an oil hole 19 to deliver oil to the bearing surface of the stub shaft. The groove thus connects the holes 17 and 19 when the follower is moved in and out and as the hub 4 and follower turn together oil will be delivered to the shaft at all times.

To rotate the mixer a large gear 20 is secured upon the outer end of each stub shaft in mesh with a small gear 21 upon each end of a counter shaft 22 mounted in bearings on the frames 2 and extending longitudinally beneath the trough. Secured upon one end of the shaft 22 is a gear 23 in mesh with a pinion 24 slidable longitudinally upon a driving shaft 25 and operatively connected thereto by means of a spline 26. The driving shaft 25 is mounted in a suitable bearing member upon the frame 2 and a gear 27 is secured upon the inner end of the shaft in engagement with a small pinion 28 upon the shaft of an electric motor 29 mounted upon the bed 1 of the machine beneath the trough 6. A pulley 30 is secured upon the outer end of the driving shaft 25 so that when the gear 24 is moved out of engagement with the gear 23 to stop the transmission of motion to the mixer 7, other machinery may be driven from the pulley 30.

The trough 6 may be tilted, its tubular hub portions turning freely within the bearings 3, to discharge the dough from the trough, and to so tilt the trough it is provided upon its lower side near each end with a gear segment 31 engaged by gears 32 upon a shaft 33 extending parallel with and at one side of the trough. Upon one end of the shaft 33 is secured a worm gear 34 engaged by a worm 35 on a shaft 36 extending across the end frame of the machine to the opposite side thereof where it is provided with a hand wheel 37.

The form of the mixer 7 is such that the mass of dough lying in the bottom of the trough is picked up at one end of the trough by the blade at that end and delivered from the inner end of the blade upon the mass of dough at the other end of the trough, which mass upon continued turning of the mixer is lifted by the other blade and conveyed back toward the opposite end of the trough. The dough falling upon the connecting bar 13 is mixed by movement of the bar as the mixer is turned, such movement tending to work the dough toward the ends of the trough and the inclination of said bar to the axis of rotation gives a stirring movement at all times to the dough. The length of the blades is such that their paths of rotation overlap and thus they sweep the entire length of the trough at each revolution.

Having thus fully described my invention what I claim is:

In a dough mixing machine, the combination of a receptacle, a rotary mixer in said receptacle mounted to turn in bearings in the ends thereof and comprising spirally inclined blades arranged at opposite ends of the receptacle and at opposite sides of the axis of rotation of said mixer, each blade being formed with a straight outer end to sweep an end wall of said receptacle and a spirally inclined edge to sweep the bottom of the receptacle with the inner end of the blade overlapping the path of travel of the other blade, and a straight bar formed integral with said blades intermediate their ends connecting the same; and means for rotating said mixer.

In testimony whereof I affix my signature in presence of two witnesses.

CURT E. OELMAN.

Witnesses:
OTTO F. BARTHEL,
A. FRANK DRAPER.

---

Copies of this patent may be obtained for five cents each, by addressing the "Commissioner of Patents, Washington, D. C."